United States Patent
Yun

(10) Patent No.: US 8,929,946 B2
(45) Date of Patent: Jan. 6, 2015

(54) ANTENNA APPARATUS OF MOBILE TERMINAL

(75) Inventor: Ju Hwan Yun, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 552 days.

(21) Appl. No.: 12/782,775

(22) Filed: May 19, 2010

(65) Prior Publication Data

US 2010/0298027 A1   Nov. 25, 2010

(30) Foreign Application Priority Data

May 21, 2009   (KR) ........................ 10-2009-0044377

(51) Int. Cl.
  *H04M 1/00*   (2006.01)
  *H01Q 1/24*   (2006.01)
  *H04M 1/02*   (2006.01)

(52) U.S. Cl.
  CPC ............. *H01Q 1/243* (2013.01); *H04M 1/0208* (2013.01); *H04M 1/0274* (2013.01)
  USPC .................. 455/553.1; 455/575.1; 455/575.5; 455/575.6; 455/575.7; 455/575.8; 343/702

(58) Field of Classification Search
  USPC .......... 455/575.1, 575.5, 575.6, 552.1, 553.1, 455/575.7, 575.8; 343/906, 702
  See application file for complete search history.

(56) References Cited

U.S. PATENT DOCUMENTS

| | | | | |
|---|---|---|---|---|
| 6,460,772 B1 * | 10/2002 | Stahl | ............................. | 235/486 |
| 7,010,334 B2 * | 3/2006 | Saito | .......................... | 455/575.7 |
| 7,369,883 B2 * | 5/2008 | Kori et al. | .................. | 455/575.3 |
| 7,693,540 B2 * | 4/2010 | Kim | ........................... | 455/550.1 |
| 8,155,599 B2 * | 4/2012 | Kato et al. | ....................... | 455/75 |
| 2006/0030265 A1 * | 2/2006 | Desai et al. | .................. | 455/41.2 |

* cited by examiner

*Primary Examiner* — Sharad Rampuria
*Assistant Examiner* — Sayed T Zewari
(74) *Attorney, Agent, or Firm* — Cha & Reiter, LLC

(57) ABSTRACT

A mobile terminal and manufacture of same are provided. The mobile terminal includes: an antenna; a first case at which the antenna is disposed; a second case coupled to the first case; a main PCB disposed at one side of the second case; and a sub-PCB disposed at an opposite side of the second case, the sub-PCB being connected to the main PCB through a cable, wherein the sub-PCB is electrically coupled with the antenna when the first case and the second case are coupled together.

20 Claims, 4 Drawing Sheets

US 8,929,946 B2

ANTENNA APPARATUS OF MOBILE TERMINAL

CLAIM OF PRIORITY

This application claims, pursuant to 35 USC 119, priority to, and the benefit of the earlier filing date of, that patent application filed in the Korean Patent Office, entitled "Antenna Apparatus of Mobile Terminal," on May 21, 2009 and afforded Ser. No. 10-2009-0044377, the contents of which are incorporated by reference, herein.

BACKGROUND OF THE INVENTION

1. Field of the Invention

The present invention relates to a mobile terminal, and more particularly, to an antenna apparatus of a mobile terminal that can be efficiently disposed within a limited space of the mobile terminal.

2. Description of the Related Art

Mobile terminals are widely used by users as they can provide various user functions such as a mobile communication function, game player function, and scheduler function while being lightweight and highly mobile. Because the mobile terminal should basically provide mobility, the mobile terminal has a small size and should have a design that satisfies a variety of different functions and/or requirements of users. Because of the intensive use of mobile terminals and their being adapted to perform many different functions it is necessary that a mobile terminal has a design that maximizes the limited space of the terminal.

An antenna of the mobile terminal is one part having particular spatial restriction because of the operating frequencies of the mobile terminal. Typically, a conventional mobile terminal has a carrier to support the antenna, and the spatial utility of the mobile terminal is deteriorated by the carrier structure. Furthermore, costs associated with the addition of the carrier structure are increased in both the cost of the carrier itself and the steps of assembling the carrier.

SUMMARY OF THE INVENTION

The present invention provides an antenna apparatus of a mobile terminal that can efficiently use space when installing an antenna within the mobile terminal.

In accordance with an aspect of the present invention, a mobile terminal includes: an antenna; a first case at which the antenna is disposed; a second case coupled to the first case; a main PCB disposed at one side of the second case; and a sub-PCB disposed at the other side of the second case, connected through the main PCB and a cable, and contacting with the antenna as the first case and the second case are coupled.

In accordance with an aspect of the present invention, A method for manufacturing a mobile terminal includes: disposing an antenna at one side of a first case of the mobile terminal, wherein an entire lower end area of the first case represents an area in which the antenna is disposed; positioning a sub-PCB (printed circuit board) at one side of a second case of the mobile terminal, the sub-PCB being oppositely positioned to the antenna, the sub-PCB including at least one contact terminal; and positioning a PCB at a second end of the second case, the PCB and the sub-PCB being electrically connected, coupling the first case and the second case such that the at least one contact terminal electrically connects to a corresponding point on the antenna.

In accordance with an aspect of the present invention, a dual-communication mode mobile terminal includes: a single antenna having a length sufficient to support each of the dual communication modes; a first PCB having contact terminals positioned to engage the antenna at lengths to support each of the dual communication modes, and a switch for determining which of the contact terminal is activated; and a second PCB, electrically connected to the first PCB providing instruction to the switch for operating in a selected one of the dual communication modes, wherein the antenna is formed in an area of a first case of the mobile terminal and the first PCB is formed in a first end of a second case of the mobile terminal opposite the antenna in the first case and second PCB is formed in second end of the second case of the mobile terminal.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE INVENTION

Figure 1:
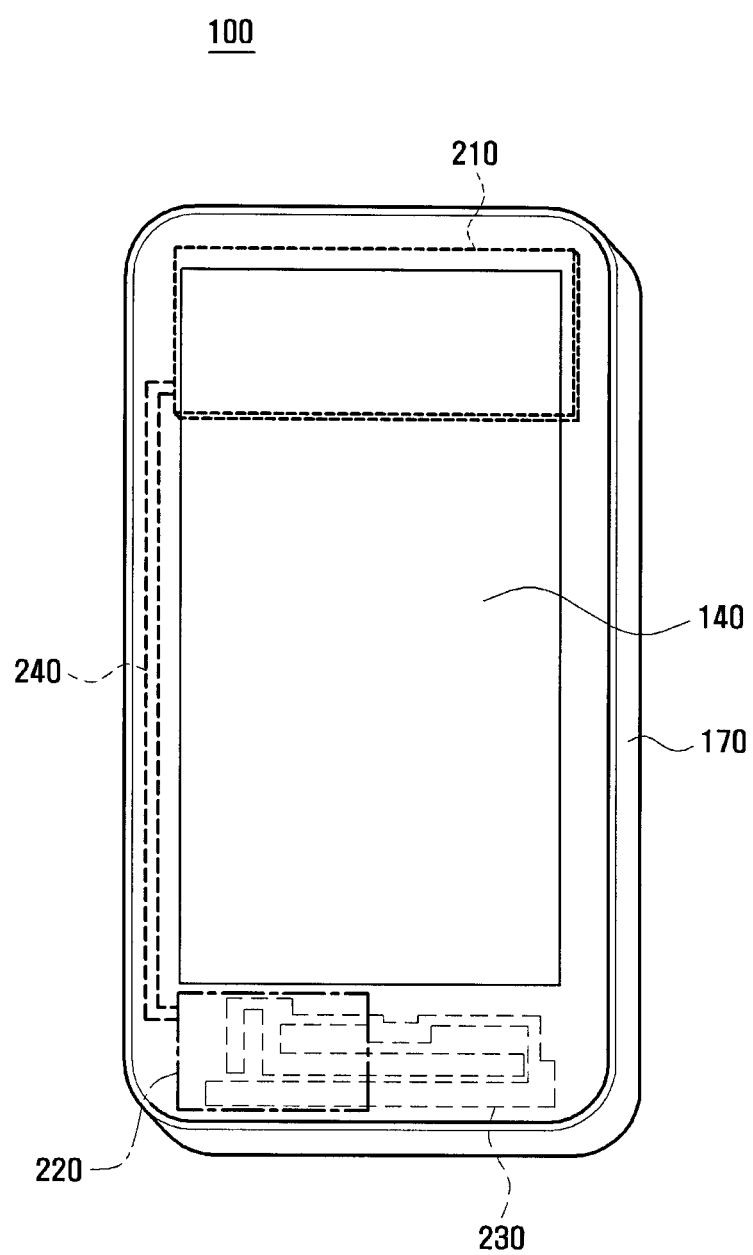
FIG. 1 is a perspective view illustrating an external appearance of a mobile terminal according to an exemplary embodiment of the present invention.

Exemplary embodiments of the present invention are described in detail with reference to the accompanying drawings. The same reference numbers are used throughout the drawings to refer to the same or like parts. The views in the drawings are schematic views only, and are not intended to be to scale or correctly proportioned. Detailed descriptions of well-known functions and structures incorporated herein may be omitted to avoid obscuring the subject matter of the present invention.

While the present invention may be embodied in many different forms, specific embodiments of the present invention are shown in drawings and are described herein in detail, with the understanding that the present disclosure is to be considered as an exemplification of the principles of the invention and is not intended to limit the invention to the specific embodiments illustrated.

FIG. 1 is a perspective view illustrating an external appearance of a mobile terminal according to an exemplary embodiment of the present invention.

Referring to FIG. 1, a mobile terminal 100 according to the present exemplary embodiment includes an antenna 230 for transmitting and receiving a communication signal, main printed circuit board (PCB) 210 for processing a signal transmitted and received using antenna 230, sub-PCB 220, display unit 140 for outputting a communication procedure and an image for supporting utilization by a user, and a case 170 for supporting the display unit 140 and having the main PCB 210, the sub-PCB 220, and the antenna 230 therein. As would be appreciated, antenna 230, PCB 210 and sub-PCB 220 are shown in dashed or dotted lines to represent that these elements are contained within case 170.

The antenna 230 performs a function of transmitting a signal when activating a communication function of the mobile terminal 100 and receiving a signal that has been transmitted by another device. The antenna 230 is contained within case 170. In order to dispose the antenna 230 within the case 170, the antenna 230 is formed in a predetermined pattern. A length or a volume of the antenna 230 changes according to a communication method of the mobile terminal 100. Further, when the mobile terminal 100 supports a plurality of communication methods, the antenna 230 has a length or a volume that can support all of the communication methods. For example, when the mobile terminal 100 supports a GSM communication method and a WCDMA communication method, the antenna 230 has a length or a volume for supporting both the GSM communication method and the WCDMA communication method.

The antenna 230 according to the present exemplary embodiment is disposed at one side of the lower end of the case 170 enclosing the edge of the display unit 140. In order to prevent movement of the antenna 230 disposed within the case 170, the antenna 230 is formed to be fastened to various latch jaws or protrusions (not shown) provided in the case 170. For example, when the antenna 230 is formed in a pattern, the antenna 230 has at least one hole (not shown) in a predetermined portion of each pattern.

The main PCB 210 controls various user functions provided by the mobile terminal 100. The main PCB 210, for example, controls supply of power supplied from a power source unit to each element of the mobile terminal 100. The PCB 210 further performs a startup or booting operation when power is first supplied to the mobile terminal.

When activation of a user function, for example, a mobile communication function is requested, the main PCB 210 controls the power supplied to a communication module, and controls the circuit to direct the antenna to transmit and/or receive a signal. Further, the main PCB 210 controls other elements, for example a camera module, broadcasting reception module, GPS module, and MP3 module, and controls the activation of various functions according to a specific function output from an input unit. The main PCB 210 stores various routines for supporting and controlling each function of the mobile terminal 100 in a storage unit and performs preparation for activating a function by loading the routines during a booting process. Further, the main PCB 210 controls the storage unit to store various information that may be generated when performing a user requested function.

The main PCB 210 is also electrically connected to the sub-PCB 220 (dashed lines 240, FIG. 1), outputs a signal necessary for mobile communication to the antenna 230 through the sub-PCB 220 connected to the antenna 230, and processes signals received by the antenna 230. The main PCB 210 is disposed at a predetermined distance from the antenna 230 and thus the main PCB 210 cannot directly contact with the antenna 230. Thus, the main PCB 210 transmits signals to, and receives signals from, the sub-PCB 220 using a cable 240 of FIG. 2.

The sub-PCB 220 has a contact terminal for contacting to the antenna 230 and contacts with the main PCB 210 through the cable 240. The sub-PCB 220 outputs a signal, output by the main PCB 210, to the antenna 230 under the control of the main PCB 210 and performs the function of outputting a signal received by the antenna 230 to the main PCB 210. In this process, the sub-PCB 220 outputs an electrical signal to the antenna 230 and receives a signal received by the antenna 230 using a contact terminal that can contact with a specific point of the antenna 230 (not shown). When the mobile terminal 100 supports a plurality of communication methods, the sub-PCB 220 has a plurality of contact terminals. In this case, each contact terminal is disposed to contact with a specific point of the antenna pattern. When the antenna 230 is formed in a pattern, frequency coverage of a receiving signal changes or sensitivity of a receiving signal changes according to a point at which the contact terminal contacts with the antenna pattern. Accordingly, the contact terminal is positioned at the sub-PCB 220 in a manner to contact with a position of the antenna pattern optimized for a particular communication method of the mobile terminal 100. In general, for a low frequency transmission/reception, an antenna pattern of a relatively long length or large volume is necessary, and in a high frequency transmission/reception, an antenna pattern of a relatively short length or small volume is necessary. Accordingly, the contact terminal contacts with a position that can widely or narrowly use an entire length of the antenna 230 according to a supporting communication method.

When the sub-PCB 220 is disposed at one side of the case 170, in order to prevent movement of the sub-PCB 220, the case 170 has a form, groove, or hole that can be coupled by an interference fit with various latch jaws or side walls provided at one side of the case 170. Thus, the sub-PCB 220 is coupled to structures provided in the case 170, thereby preventing movement of the sub-PCB 220. The sub-PCB 220 is described with reference to FIG. 4.

Returning to FIG. 1, the display unit 140 is an element for outputting a predetermined image during a process of activating various functions of the mobile terminal 100. For example, in a process of booting the mobile terminal 100, the display unit 140 can output a predetermined image while performing a booting process and after a booting process is complete, the display unit 140 can output an image according to activation of a specific user function. That is, the display unit 140 displays information input by the user or information provided to the user as well as various menus of the mobile terminal 100 or can provide various screens, for example, a standby screen, a menu screen, a message writing screen, and a communication screen. The display unit 140 can be formed as a flat panel display such as a liquid crystal display (LCD) and an organic lighted emit diode (OLED), and when the flat panel display is formed in a touch screen form, the display unit 140 can be used as an input means. When the display unit 140 is formed in a touch screen form, the display unit 140 has both a display panel and a touch sensor disposed on the display panel. As the display unit 140 supports a touch screen, the mobile terminal 100 can provide various menu screens from which applications may be executed based on the touch screen. As an edge area of the display unit 140 is supported by the case 170, movement of the display unit 140 is prevented, and light leaking phenomenon in which light emitted by backlight is leaked to a side surface is prevented.

The case 170 encloses the edge of the display unit 140 and includes a first case in which the antenna pattern is disposed and a second case in which the main PCB 210 and the sub-PCB 220 are disposed. The case 170 substantially has all elements of the mobile terminal 100 therein, has various elements for preventing movement of each element therein, and can be formed in various shapes for durability. An exemplary structure of case 170 is described in detail with reference to FIG. 2.

Figure 2:
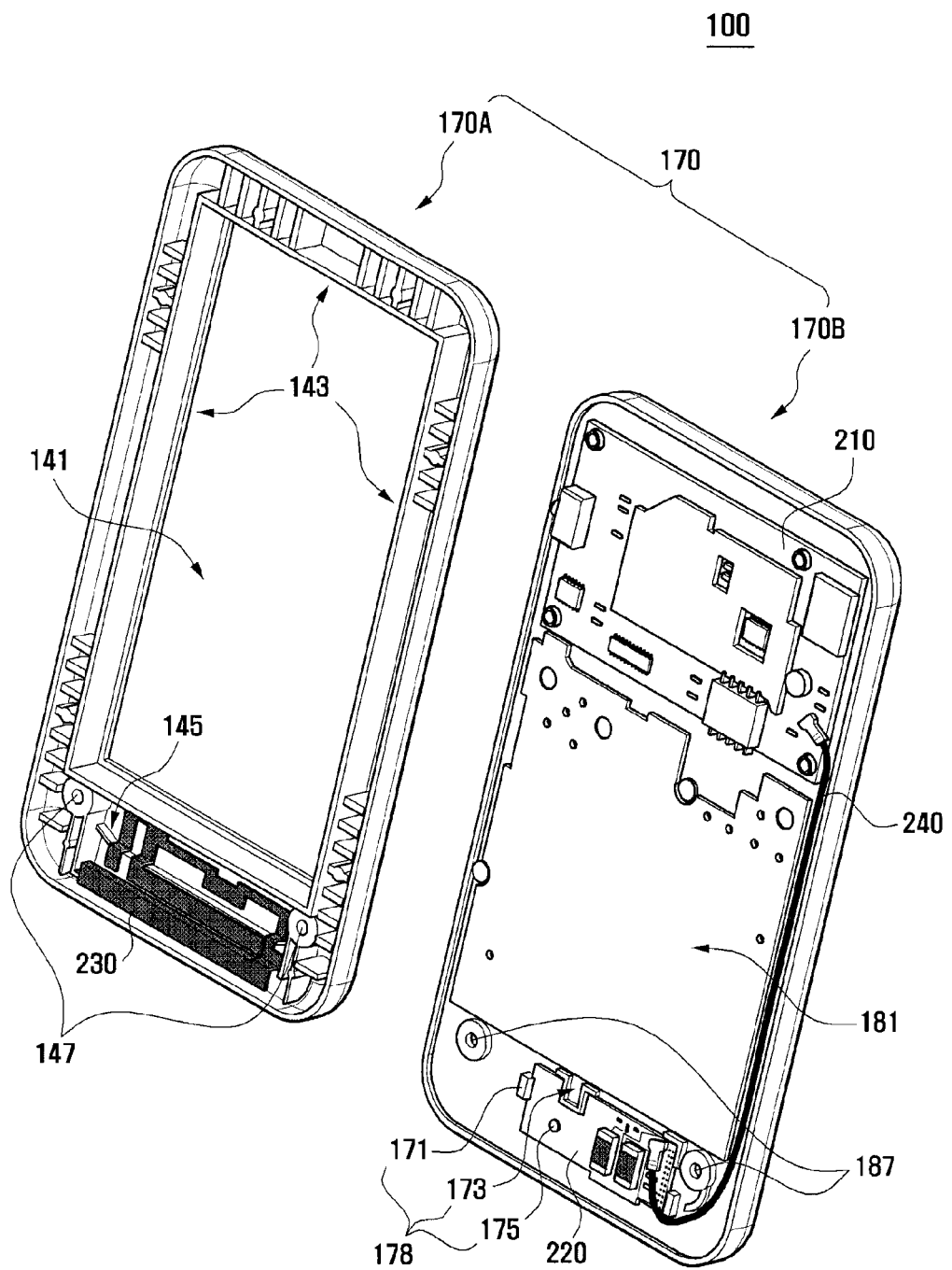
FIG. 2 is an exploded perspective view illustrating an internal configuration of a case of the mobile terminal of FIG. 1.

FIG. 2 is an exploded perspective view illustrating an internal configuration of the case 170 of the mobile terminal 100 of FIG. 1.

In the following description, in the mobile terminal 100, the case 170 has a shape that can be applied to a bar type or slide type mobile terminal. However, the present invention is not limited thereto, and other types of mobile terminals, for example, a folder type mobile terminal, the sub-PCB 220 according to the present exemplary embodiment is provided between the main PCB 210 and the antenna pattern to have a structure for supporting a signal.

Referring to FIG. 2, as the case 170 of the mobile terminal 100, a first case 170A and a second case 170B are provided. Various structures for supporting a function of the mobile terminal 100 can be disposed within the case 170, and thus each of the first case 170A and the second case 170B has structures therein, and circumferential edges of the first case 170A and the second case 170B are coupled together to prevent separation or movement of the structure.

As shown in FIG. 2, the first case 170A includes an opening 141 for exposing the display unit 140 and an antenna housing 145 for retaining the antenna pattern. When the first case 170A supports the opening 141 and the display unit 140 is disposed therein, side walls 143 cover the edges of the display unit 140 provided in the first case 170A, and a first screw coupling structure 147 that can be coupled to the second case 170B by a screw is provided in an area adjacent to the antenna housing 145. In a portion of an opening direction of the antenna housing 145, one of the side walls 143 encloses the edge of the display unit 140. Each of the side walls 143 has a section of a character "L", and structures extended in a direction of the opening 141 are formed to contact with the edge of the display unit 140 of the side wall 143. In the side walls 143, in order to improve solidity of the side walls 143, an auxiliary structure for supporting each side wall 143 may be disposed at a predetermined distance.

The antenna housing 145 is an element for housing the antenna pattern and is formed in a step shape, and the antenna pattern is disposed at a surface thereof. A latch jaw or a protrusion is provided in the predetermined distance or a predetermined position of the antenna housing 145. The latch jaw or the protrusion is fastened to a hole formed in the antenna pattern in order to more securely support the antenna 230. In order to prevent movement of the antenna pattern, adhesives are coated on a surface of the antenna housing 145. The first screw coupling structure 147 that can be used to couple the second case 170B to the first case 170A by a screw is provided at one side of the first case 170A. In this way, in the first case 170A, as the antenna housing 145 is provided in a predetermined area of the case 170, the antenna pattern can be directly disposed.

An opening (not shown) for housing a battery is provided in the second case 170B and side walls having a character "L" form for housing various structures are provided within the second case 170B. Various structures can be housed in the second case 170B. For example, the main PCB 210 is disposed at the upper side of the second case 170B and the sub-PCB 220 is disposed at the lower side thereof. Space between the main PCB 210 and the sub-PCB 220 performs a function as a battery housing 181 for housing a battery. Further, although not shown in FIG. 2, at the lower end of the main PCB 210, other elements of the mobile terminal 100, for example, a camera module, a broadcasting reception module, or an MP3 module are disposed. At the lower end of the second case 170B, a PCB housing 178 for housing the sub-PCB 220 is provided. The PCB housing 178 includes a protruding portion 173 for coupling to a groove formed in the sub-PCB 220, a latch jaw 171 for fixing one side surface of the sub-PCB 220, and a protrusion 175 for penetrating a hole formed in the sub-PCB 220 and for fixing the sub-PCB 220. Additionally, side walls enclosing side surfaces of the sub-PCB 220 and for guiding, the sub-PCB 220 are provided in the PCB housing 178. A second screw coupling structure 187 corresponding to the first screw coupling structure 147 provided in the first case 170A is formed at one side of the second case 170B. The cable 240 for connecting a contact point formed at one side of the sub-PCB 220 and a contact point formed at one side of the main PCB 210 is disposed along one side wall of the second case 170B.

When the sub-PCB 220 disposed at one side of the second case 170B is coupled to the first case 170A, the sub-PCB 220 electrically contacts with the antenna pattern provided in the first case 170A. Accordingly, the mobile terminal 100 according to the present exemplary embodiment forms a communication path including the main PCB 210, the sub-PCB 220, the antenna 230, and the cable 240. The communication path is described in detail with reference to FIG. 3.

Figure 3:
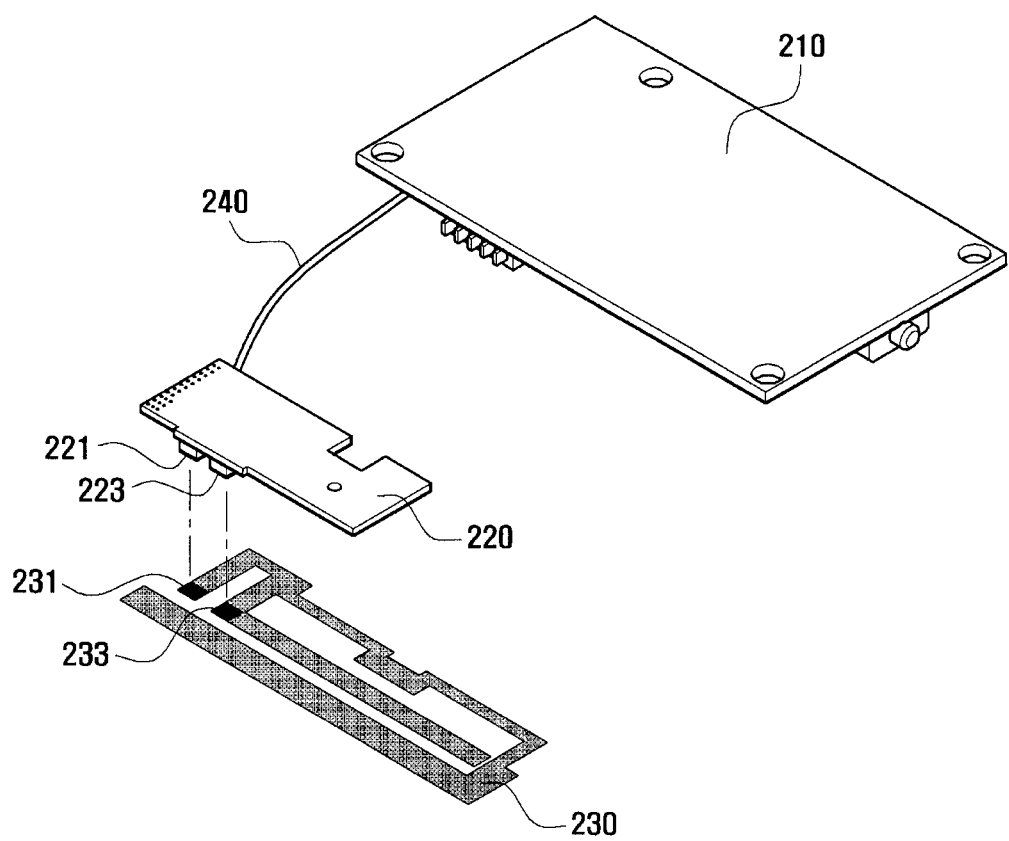
FIG. 3 is a perspective view illustrating only elements included in an antenna apparatus of the mobile terminal of FIG. 1.
Figure 4:
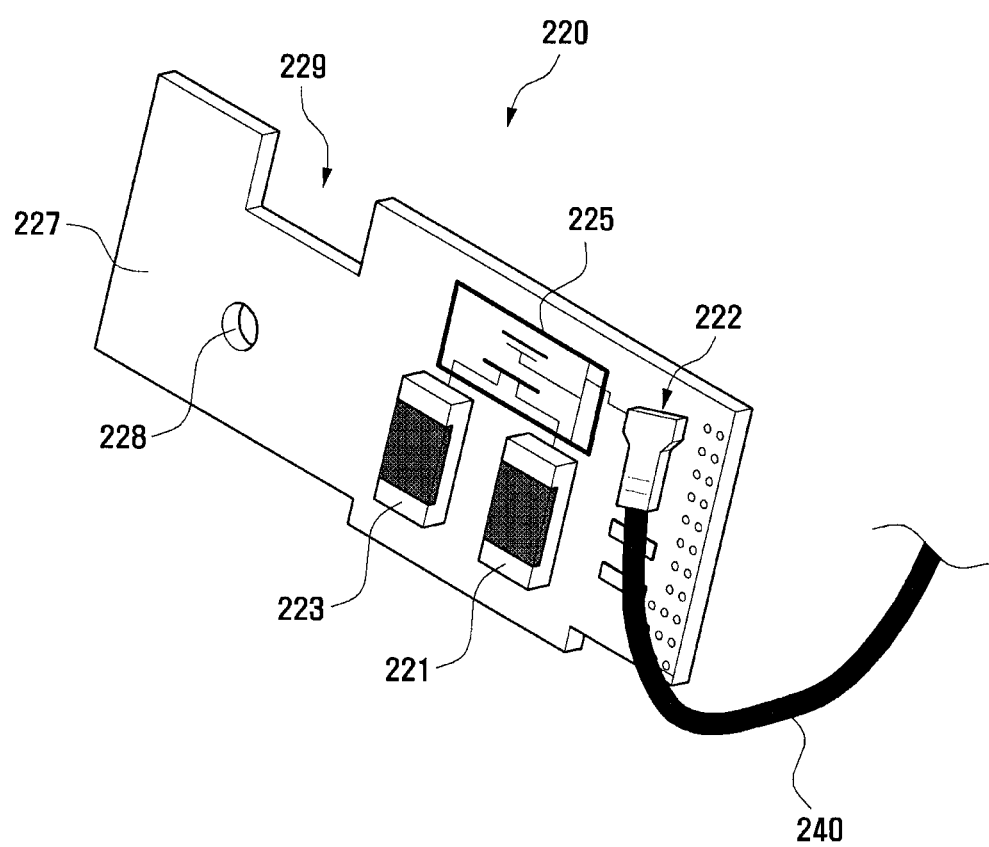
FIG. 4 is a perspective view illustrating a configuration of a sub-PCB of the mobile terminal of FIG. 1.

FIG. 3 is a perspective view illustrating only elements included in an antenna apparatus in the mobile terminal 100 of FIG. 1, and FIG. 4 is a perspective view illustrating a configuration of the sub-PCB 220 in the mobile terminal 100 of FIG. 1.

Referring to FIGS. 3 and 4, the antenna apparatus according to the present exemplary embodiment includes a main PCB 210, sub-PCB 220, antenna 230, and cable 240. Here, the antenna 230 is formed in a pattern of a predetermined form (length) and may be formed in a form corresponding to that of the antenna housing 145 provided in the first case 170A).

In the antenna apparatus according to the present exemplary embodiment, as described above, in the main PCB 210, other communication elements of the mobile terminal 100, for example a communication module corresponding to a communication method supported by the mobile terminal 100, a microphone for collecting an external audio signal, a speaker for outputting a received signal, and a storage unit for storing various application programs for connecting to a web server are mounted. Alternatively, the main PCB 210 may be electrically connected to elements disposed on one side of the case 170. The main PCB 210 is connected to the sub-PCB 220 through the cable 240. The PCB 210 outputs a signal to the sub-PCB 220 or receives a signal from the sub-PCB 220 through the cable 240.

The cable 240 performs a function of a signal input terminal or a signal output terminal in the main PCB 210 and the sub-PCB 220. The cable 240 is disposed at one side wall of the case 170 and has a contact point for contacting with each of the main PCB 210 and the sub-PCB 220.

Referring to FIG. 4, the sub-PCB 220 includes a board 227 in which structures are mounted, a contact point 222 connected to the cable 240 at one side of the board 227, a circuit 225 electrically connected to the contact point 222 and for contacting with each of the contact terminals, and a first contact terminal 221 and second contact terminal 223 connected to the circuit 225.

The board 227 is made of various materials such as wood or plastic and is formed in a form corresponding to a PCB housing provided in the second case 170B of the mobile terminal 100. That is, the board 227 has a groove 229 fastened to the protruding portion 173 provided in the PCB housing 178 and a hole 228 fastened to a protrusion 175 provided in the PCB housing 178. Edges of the board 227 are formed to correspond to side walls 143 for a guide provided in the PCB housing 178.

The contact point 222 is a point in which the cable 240 contacts and is formed through a soldering (or similar fixed attaching means, e.g. an adhesive) operation for electrically connecting an end portion of the cable 240 and the sub-PCB 220. The contact point 222 is electrically connected to the circuit 225. For this, the sub-PCB 220 further includes a signal line for electrically connecting the contact point 222 and the circuit 225.

When the circuit 225 contacts with the antenna 230, the circuit 225 is an element for performing impedance matching and is an element for controlling the form of a communication path of one of the contact terminals connected to the circuit 225. The circuit 225 includes a switch for controlling the communication path with the first contact terminal 221 or the second contact terminal 223 according to a signal output from the main PCB 210 and includes elements for impedance matching.

The first contact terminal 221 is a terminal contacting with a first point 231 of the antenna pattern (see FIG. 3) and is an element that can be connected to the antenna pattern when the mobile terminal 100 supports a specific communication method, for example a GSM communication method.

The second contact terminal 223 is a terminal contacting with a second point 233 of the antenna pattern (see FIG. 3) and is an element that can be connected to the antenna pattern when the mobile terminal 100 supports a specific communication method, for example a WCDMA communication method. Thus, in one mode the length of the antenna line is based on the first contact terminal 221 and in another mode the length of the antenna line is based on the second contact terminal 223.

In order to support both communication methods, the first contact terminal 221 and the second contact terminal 223 may simultaneously contact with the first point 231 and the second point 233, respectively. As described above, the mobile terminal 100 according to the present exemplary embodiment has the sub-PCB 220 disposed at the second case 170B contacting with the antenna 230 disposed within the first case 170A and the main PCB 210 disposed within the second case 170B using the antenna 230 through the sub-PCB 220.

In the antenna apparatus according to the present exemplary embodiment, as the antenna 230 is disposed at one side of the first case 170A, an entire lower end area of the first case 170A can be used as an area in which the antenna pattern is disposed, and as the antenna pattern is disposed at a surface of the inside of the first case 170A, occupying space of an antenna structure in the first case 170A can be minimized and disposition space of the antenna 230 can be maximized.

In the antenna apparatus according to the present exemplary embodiment, as the main PCB 210 can be separated from the antenna 230, the main PCB 210 can be more flexibly disposed, and after the sub-PCB 220 contacting with the antenna 230 is disposed within the second case 170B, the sub-PCB 220 and the antenna 230 contact by a coupling force of the first case 170A and the second case 170B, and thus the sub-PCB 220 and the antenna 230 can be more securely connected.

In the foregoing description, the sub-PCB 220 has two contact terminals, i.e. the first contact terminal 221 and the second contact terminal 223, however the present invention is not limited thereto and the sub-PCB 220 may have one or more contacts with the antenna pattern depending upon the number of frequency bands which the mobile terminal may operate. As described above, according to an antenna apparatus of a mobile terminal, an antenna pattern is provided using a case of the mobile terminal except for a carrier, by providing a sub-board attached to the antenna pattern, disposition space of the antenna can be efficiently used and a process for assembling the mobile terminal can be more stably and simply supported and production costs may be reduced.

Although exemplary embodiments of the present invention have been described in detail hereinabove, it should be clearly understood that many variations and modifications of the basic inventive concepts herein described, which may appear to those skilled in the art, will still fall within the spirit and scope of the exemplary embodiments of the present invention as defined in the appended claims.

What is claimed is:

1. A mobile terminal, comprising:
    an antenna;
    a first case at which the antenna is disposed;
    a second case, in which a main Printed Circuit Board (PCB) and a sub-PCB are disposed on different sides, the second case opposing the first case and being mechanically coupled to the first case;
    wherein the sub-PCB is connected to the main PCB through a cable, and the antenna and the sub-PCB are arranged to become electrically connected as the first case and the second case are mechanically coupled.

2. The mobile terminal of claim 1, wherein the antenna is disposed in a pattern shape at a surface of a portion of the inside of the first case.

3. The mobile terminal of claim 1, wherein the sub-PCB comprises:
    at least one contact terminal contacting with the antenna;
    a contact point to which the cable is connected; and
    a circuit disposed between the contact terminal and the contact point, the circuit for supporting impedance matching of the antenna.

4. The mobile terminal of claim 3, wherein the contact terminal comprises a plurality of terminals contacting with a plurality of points of the antenna respectively.

5. The mobile terminal of claim 4, wherein the circuit comprises a switch disposed between an antenna contact point and a corresponding contact terminal and forms an electrical connection for forming a communication path.

6. The mobile terminal of claim 5, wherein the circuit controls the switch so that each of the contacting terminals and the corresponding antenna contact points are selectively selected to support a corresponding communication method under control of the main PCB.

7. The mobile terminal of claim 1, wherein one side of the second case comprises a PCB housing comprising at least one of:
    a latch jaw contacting with one side of the sub-PCB;
    a protruding portion fastened to one side of the sub-PCB; and
    a protrusion fastened to one side of the sub-PCB.

8. The mobile terminal of claim 7, wherein the sub-PCB comprises at least one groove and at least one hole fastened to at least one of the protruding portion, the latch jaw, and the protrusion provided in the PCB housing.

9. A method for manufacturing a mobile terminal comprising:
    disposing an antenna at one side of a first case of the mobile terminal, wherein an entire lower end area of the first case represents an area in which the antenna is disposed;
    attaching a sub-PCB (printed circuit board) to an inner side of a second case of the mobile terminal at a first end thereof, the sub-PCB being oppositely positioned to the antenna, the sub-PCB including at least one contact terminal;
    attaching a main PCB to the inner side of the second case at an opposite end thereof, the main PCB and the sub-PCB being electrically connected; and
    mechanically coupling the first case to the second case with a coupling force sufficient to cause the at least one contact terminal to electrically connect to a corresponding point on the antenna.

10. The method of claim 9, wherein each of the antenna, the sub-PCB and the PCB are fastened with at least one of: a latch jaw, and a protruding portion.

11. The method of claim 9 wherein the first and second cases together form the mobile terminal assembled in a bar shape when mechanically coupled.

12. The method of claim 9, further comprising:
disposing a display unit within the first case, the display unit being in communication with the PCB, wherein the first case includes a opening sized to retain the display unit.

13. The method of claim 12, wherein the sides of the opening are in the form of a character "L" shape.

14. The mobile terminal of claim 1, wherein the first and second cases together form the mobile terminal assembled in a bar shape when coupled.

15. The method of claim 14, wherein a position of the at least one contact terminal in contact with the antenna determines a communication mode from a plurality of communication modes.

16. The method of claim 15, wherein the sub-PCB includes a switch to select one of the least one contact terminals.

17. The method of claim 16, wherein the switch is controlled by the PCB.

18. A dual-communication mode mobile terminal including:
a single antenna having a length sufficient to support each of the dual communication modes;
a first Printed Circuit Board (PCB) including:
contact terminals positioned to engage the antenna at lengths to support each of the dual communication modes; and
a switch for determining which of the contact terminals is activated; and
a second PCB, electrically connected to the first PCB providing instruction to the switch for operating in a selected one of the dual communication modes, wherein the antenna is formed in an area of a first case of the mobile terminal and the first PCB is formed in a first end of a second case of the mobile terminal opposite the antenna in the first case and the second PCB is formed in a second end of the second case of the mobile terminal.

19. The mobile terminal of claim 18, wherein the contact terminals of the first PCB comprise first and second contact terminals, and the single antenna has first and second contact points for contacting the first and second contact terminals, respectively, each contact point corresponding to one of the dual-communication modes, whereby a different antenna characteristic is provided for each communication mode.

20. The mobile terminal of claim 19, wherein the first and second cases together form the mobile terminal assembled in a bar shape when coupled, the first and second cases oppose each other, and further comprising means for coupling the first case and the second case such that, when the first and second cases become coupled, the first and second contact terminals electrically connect to the first and second contact points of the antenna, respectively.

* * * * *

UNITED STATES PATENT AND TRADEMARK OFFICE
CERTIFICATE OF CORRECTION

Page 1 of 1

PATENT NO.         : 8,929,946 B2
APPLICATION NO.    : 12/782775
DATED              : January 6, 2015
INVENTOR(S)        : Ju Hwan Yun It is certified that error appears in the above-identified patent and that said Letters Patent is hereby corrected as shown below:

In the Claims

Column 9, Claim 11, Line 4 should read as follows:
--...claim 9, wherein the...--

Column 9, Claim 12, Line 10 should read as follows:
--...includes an opening sized...--

Column 9, Claim 16, Line 22 should read as follows:
--...the at least one...--

Column 10, Claim 18, Line 5 should read as follows:
--...are activated; and...--

Signed and Sealed this
Seventh Day of April, 2015

Michelle K. Lee
*Director of the United States Patent and Trademark Office*